UNITED STATES PATENT OFFICE.

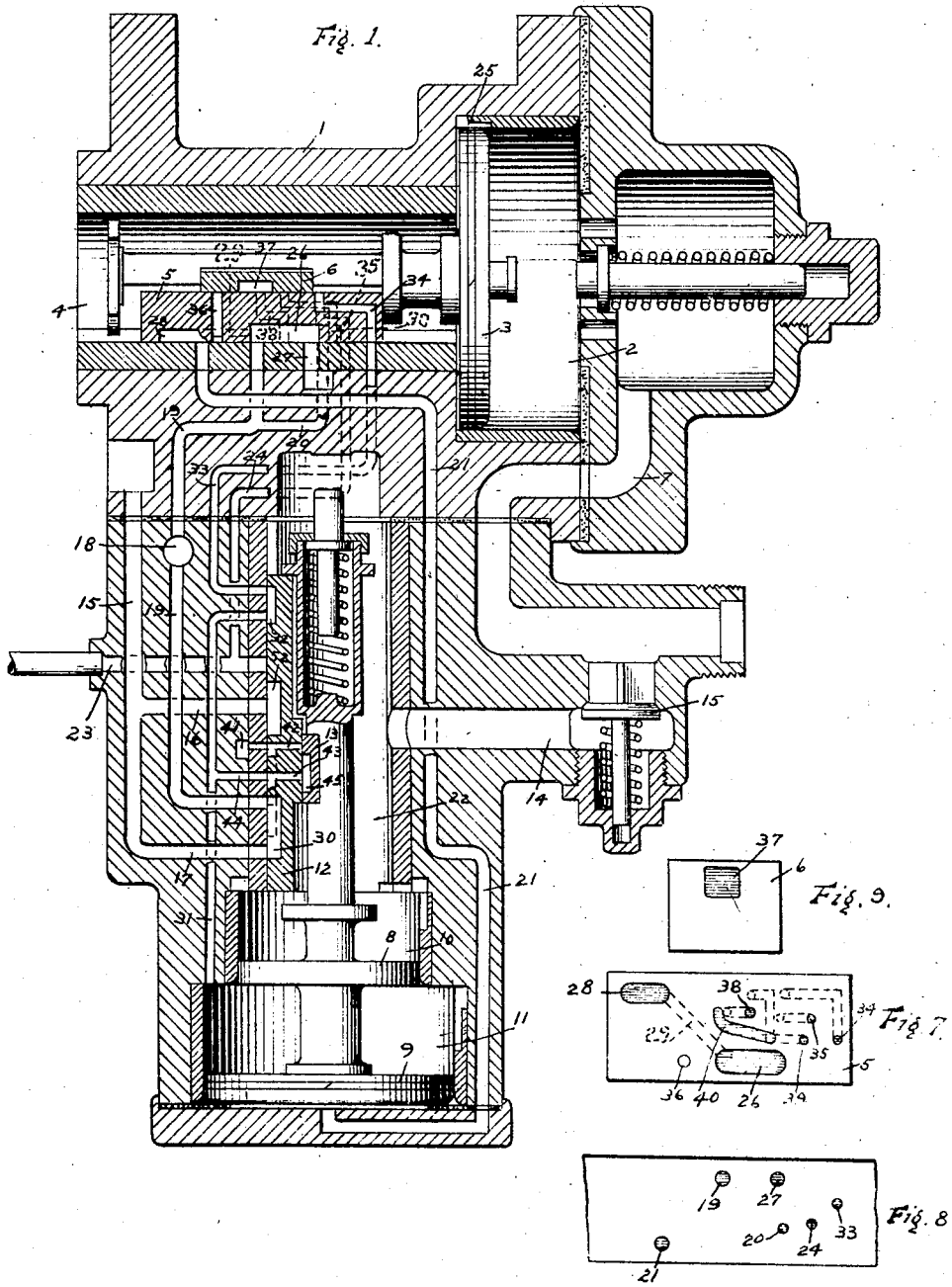

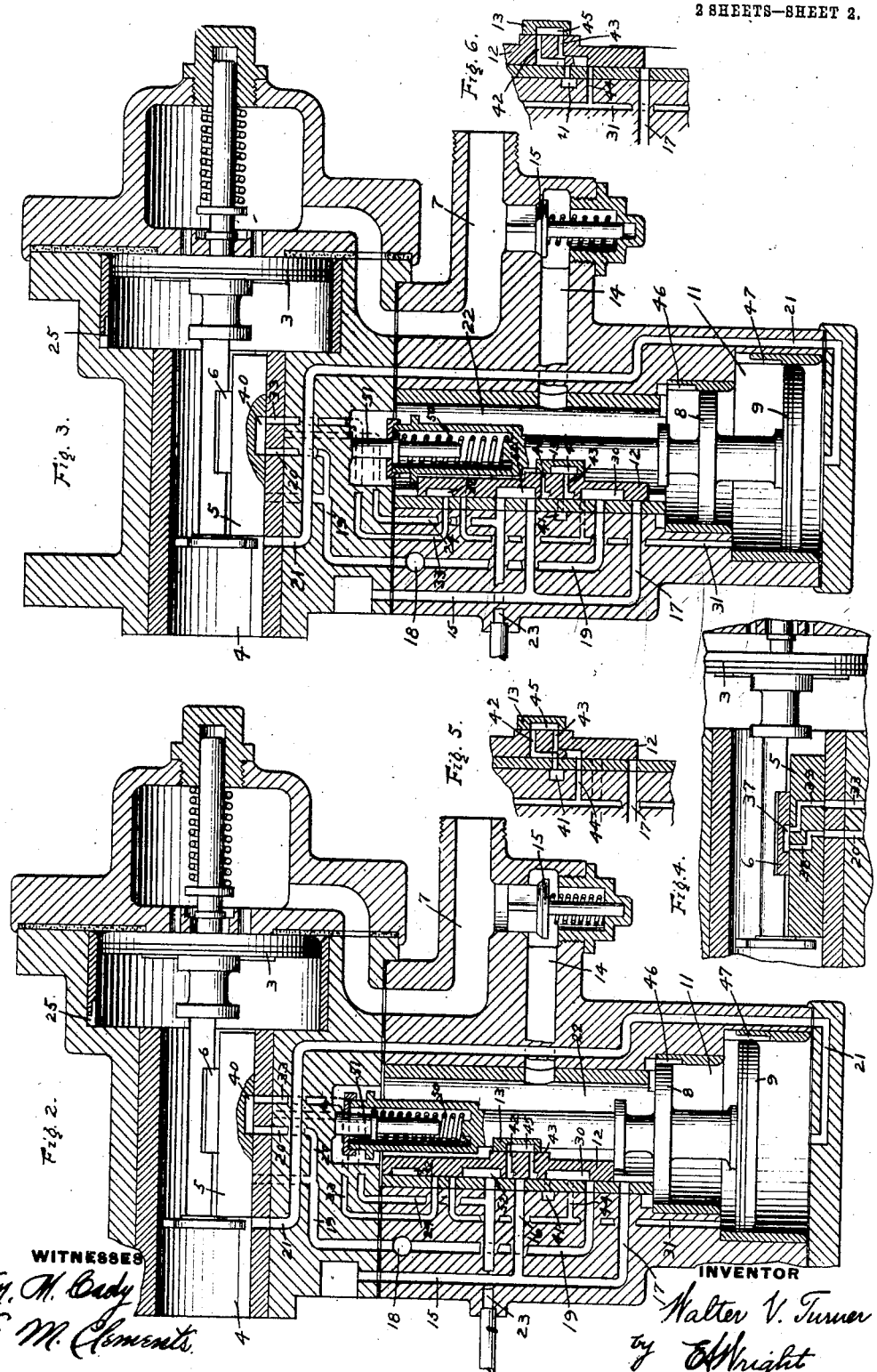

WALTER V. TURNER, OF EDGEWOOD, PENNSYLVANIA, ASSIGNOR TO THE WESTING-HOUSE AIR BRAKE COMPANY, OF PITTSBURG, PENNSYLVANIA, A CORPORATION OF PENNSYLVANIA.

TRIPLE-VALVE DEVICE.

969,427.            Specification of Letters Patent.        Patented Sept. 6, 1910.

Application filed September 25, 1908. Serial No. 454,776.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates in general to fluid pressure brakes, and more particularly to the emergency valve mechanism of a triple valve device.

It has been proposed to employ an emergency valve mechanism comprising a slide valve contained in a valve chamber open to the local brake pipe vent passage and a movable abutment for actuating said valve in emergency applications of the brakes to open a vent port from said valve chamber and thereby locally vent the brake pipe. A construction of this character is desirable as the brake pipe pressure acts on the slide valve at all times in a direction tending to hold same to its seat.

One object of my invention is to provide an improved emergency valve mechanism of the above character having means for securing a more positive and certain action of the parts in emergency applications, for which purpose I employ an actuating abutment comprising differential heads normally subject in one direction to brake pipe pressure and operated by varying the fluid pressures on one of the heads when the brake pipe pressure is reduced.

Another object of my invention is to provide an improved emergency valve mechanism in which the local brake pipe vent port, the supply of air from an additional source of fluid pressure and communication from the brake cylinder through a safety valve device are all governed by a single operating abutment.

In the accompanying drawings; Figure 1 is a central sectional view of a triple valve device embodying my improvements, showing the relative position of the parts in normal full release position; Fig. 2 a similar view, showing the parts in emergency application position; Fig. 3 a similar view, showing the parts in emergency lap position; Fig. 4 a fragmentary section of the triple valve device with the parts in service application position; Fig. 5 a similar section of the emergency valve means in an intermediate position as the parts move to emergency position; Fig. 6 a view similar to Fig. 5, with the parts slightly more advanced toward the emergency position; Fig. 7 a face view of the main slide valve of the triple valve device, showing the relative location of ports and passages; Fig. 8 a plan view of the valve seat for the main slide valve; and Fig. 9 a face view of the auxiliary or graduating valve which is mounted on the main slide valve.

According to the drawings, the improved triple valve device comprises a casing 1 having piston chamber 2 containing piston 3, valve chamber 4 containing main slide valve 5 and auxiliary valve 6 mounted on and having a movement relative to said main slide valve, the piston chamber 2 being connected in the usual manner by a passage 7 with the brake pipe and the valve chamber 4 being open to the auxiliary reservoir. The emergency valve mechanism is preferably arranged in the triple valve casing 1 and comprises a differential piston having two heads 8 and 9 adapted to operate respectively in piston chambers 10 and 11, an emergency slide valve 12 and an auxiliary valve 13 mounted on and having a movement relative to the valve 12 said valves being contained in the valve chamber 22. Local brake pipe vent passage 14 containing the usual non-return check valve 15, opens into valve chamber 22.

The brake cylinder passage 15 is provided with two branch passages 16 and 17 opening at the seat of the emergency valve 12.

The safety or reducing valve communicates with passage 18 which opens into a passage 19 leading to the seat of the emergency slide valve and also opening at the seat of the main slide valve and having a branch passage 20 which likewise leads to the main slide valve seat. A passage 21 connects the piston chamber below piston head 9 with the main slide valve seat and the supplemental reservoir is connected to a pipe and passage 23 leading to the seat of emergency slide valve 12 and having a branch passage 24 leading to the seat of the main slide valve 5.

Air supplied to the brake pipe drives the triple piston 3 to its full release position as shown in Fig. 1 and flows through the feed groove 25 around the triple piston charging the auxiliary reservoir and valve chamber 4 to standard pressure in the usual manner.

In the full release position, a cavity 26 in the main slide valve, connects exhaust port 27 with port 19 and a cavity 28 connected by passage 29 with cavity 26 registers with passage 21, so that the outer face of piston head 9 is open to atmospheric pressure and consequently air from the brake pipe flowing past check valve 15 through passage 14 enters valve chamber 22 and acting on piston head 8 forces the emergency valve parts to their outer position, in which a cavity 30 in the emergency slide valve 12 connects passage 19 with branch passage 17 leading to brake cylinder passage 15. Consequently the brake cylinder is open to the exhaust through the emergency valve and the passage 19 leading to the safety valve. The space between the piston heads 8 and 9 is connected by a passage 31 through a cavity 32 in valve 12 with a passage 33 leading to the seat of main slide valve 5 and through a port 34 in said main valve registers with the passage 33, so that air flowing from the brake pipe to valve chamber 22 may pass around piston head 8, which is loosely fitted in chamber 10, and thence through passage 31, cavity 32, passage 33, and port 34 to the valve chamber 4 and thereby assist in the quick charging of the auxiliary reservoir.

The supplemental reservoir is charged by means of a through port 35 which registers with passage 24 leading to the supplemental reservoir pipe 23.

The parts being thus charged to the normal standard pressure carried in the system, if it is desired to make a service application of the brakes; the brake pipe pressure is reduced and then the preponderating auxiliary reservoir pressure causes the triple piston to move out to service position, the auxiliary valve 6 being first moved relatively to the main slide valve 5 so as to close the ports 34 and 35 and uncover the through service port 36. The main slide valve is then shifted and service port 36 is brought into register with passage 19, so that fluid from the auxiliary reservoir may flow through passage 19, cavity 30 in the emergency valve 12, and passage 17 to the brake cylinder. In this position a cavity 37 in the auxiliary valve 6 may also connect through ports 38 and 39, as shown in Fig. 4, which latter ports register respectively with passages 20 and 33, so that air may flow from the brake pipe through port 14 to valve chamber 22 and thence around piston head 8, through passage 31, cavity 32, passage 33, port 39, cavity 37, port 38, passage 20, passage 19, and cavity 30 in emergency slide valve 12 to brake cylinder port 17, thus providing a quick service vent from the brake pipe to the brake cylinder, to hasten the serial action on the cars in service applications of the brakes.

It will be noted that in service position the cavity 28 is still in register with passage 21, so that the outer face of head 9 remains at atmospheric pressure.

Upon equalization of auxiliary reservoir and brake pipe pressures the triple piston moves back to lap position in the usual manner, closing service port 36 and cutting off the quick service vent port.

The brakes may be released by increasing the brake pipe pressure, whereupon the triple piston is shifted to release position and the brake cylinder pressure is released to the atmosphere, while the recharging ports are opened so as to again charge the parts to normal standard pressure.

Upon sudden reduction in brake pipe pressure the triple piston is shifted its full traverse to emergency position, as shown in Figs. 2 and 3, in which port 21 is uncovered by the movement of the main slide valve 5 and fluid pressure from the auxiliary reservoir is supplied to the chamber at the outer face of emergency piston head 9. A cavity 40 in the main slide valve connects passages 20 and 33 so that communication is opened from the space between piston heads 8 and 9, through passage 31, cavity 32 in the emergency slide valve 12, passage 33, cavity 40 in main slide valve 5, passage 20, passage 19, and cavity 30, to brake cylinder passage 17. A reduction in pressure by flow to the brake cylinder is thus produced in chamber 11 and as the piston head 8 is of less area than head 9, it will be evident that the auxiliary reservoir pressure on the outer face of piston head 9 preponderates over the pressures acting on piston head 8 in valve chamber 22 and the reduced pressure on the differential area of piston head 9, so that the emergency abutment is shifted inwardly. During this inward movement of the emergency valve parts, in order to assist in and more positively insure the full movement thereof, I preferably provide an exhaust port 41, and through ports 42 and 43 in the emergency slide valve 12, the latter ports registering in the normal release position of the parts respectively with exhaust port 41 and a passage 44, opening into passage 31 which leads to chamber 11. The auxiliary emergency valve 13 has a cavity 45 and on the preliminary inward movement of the emergency abutment, connects the passages 42 and 43. Thus the chamber 11 is vented directly to the atmosphere, and as the passages 42 and 43 are provided with port extensions, the atmospheric connection is maintained until the emergency valve moves to the position shown in Fig. 5, which is just before the brake cylinder port 17 is uncovered by the emergency valve. At this point the valve 12 begins to close the exhaust port 41 and open the brake cylinder passage 17 and preferably when the brake cylinder passage is partly open the exhaust port 41 is entirely closed. Air from the brake pipe then flows through the vent passage 14 to valve chamber 22 and thence through brake cylinder passage 17 directly to the brake cylinder. The emergency parts finally move to the extreme inner position as shown in Fig. 2, with port 17 fully open, so that a local reduction in brake pipe pressure is produced for securing quick serial action of all the triple valves throughout the train in the well known manner. Grooves 46 and 47 are provided to open communication around the respective piston heads 8 and 9 in this inner position of the parts, so that fluid from the auxiliary reservoir can now flow through passage 21 to the chamber at the outer face of piston head 9 and thence through grooves 46 and 47 to valve chamber 22 and through brake cylinder passage 17 to the brake cylinder. At about the position that the cavity 45 connects the passages 42 and 43 it will be noted the cavity 32 moves so that communication is cut off between passages 31 and 33, and thereby the brake cylinder connection from the chamber 11 is closed.

The emergency valve parts remain in their inner position until equalization of the auxiliary reservoir pressure into the brake cylinder, and in order to then return the parts to emergency lap position a spring 50 is provided, which is adapted to be compressed by spring stem 51 engaging the casing in the inner position, so that when the fluid pressures equalize on the emergency abutment, the spring will return the parts to emergency lap position, as shown in Fig. 3, in which the grooves 46 and 47 are closed and also the brake cylinder passage 17. In this lap position a cavity 52 in the emergency slide valve 12 is adapted to connect supplemental reservoir passage 23 with branch passage 16 leading to the brake cylinder passage 17, so that air from the supplemental reservoir may now flow to the brake cylinder. As the auxiliary reservoir is cut off in this position, the supplemental reservoir pressure equalizes only into the brake cylinder and a correspondingly higher degree of pressure is thus obtained.

It is to be noted that in the movement of the emergency parts inwardly, the cavity 30 moves so as to close communication from the brake cylinder passage 17 to passage 19 which leads to the safety valve connected to passage 18, and consequently the safety valve being cut off, the high ultimate brake cylinder pressure is retained in the brake cylinder. The cavity 52 will momentarily connect the ports 16 and 23 in the inward movement of the parts, but the ports do not register long enough to effect any substantial flow of air from the supplemental reservoir to the brake cylinder.

The brakes may be released after an emergency application by increasing the brake pipe pressure, whereby the triple piston is shifted inwardly to normal full release position and port 21 is connected by cavity 28 with the atmosphere, thereupon the fluid pressure acting on the inner side of the emergency abutment shifts the emergency parts to the normal release position, as shown in Fig. 1. Cavity 30 establishes communication from the brake cylinder passage 17 to passage 19, which is now connected by exhaust cavity 26 with exhaust port 27, so that the fluid in the brake cylinder is released.

It will now be apparent that the emergency valve mechanism is adapted to be positively actuated in an emergency application independently of the brake pipe pressure, while employing a single compact valve mechanism for governing the emergency functions of the triple valve device.

Having now described my invention, what I claim as new and desire to secure by Letters Patent, is:—

1. In a fluid pressure brake, the combination with a triple valve and brake cylinder, of an emergency valve mechanism comprising valve means for controlling a local brake pipe vent port and an actuating abutment for said valve means comprising differential heads normally subject in one direction to fluid under pressure from the brake pipe and means adapted upon a reduction in brake pipe pressure to vary the fluid pressure on one of said heads and thereby operate said abutment and valve means.

2. A triple valve device comprising valve means for controlling the brake cylinder service port and an actuating piston therefor subject to the opposing pressures of the brake pipe and auxiliary reservoir, and an emergency valve mechanism comprising a valve for controlling a brake pipe vent port and a movable abutment provided with differential heads normally subject in one direction to fluid at substantially brake pipe pressure and means for venting fluid from one head upon a sudden reduction in brake pipe pressure to thereby operate the abutment and said valve.

3. In a triple valve device, an emergency valve mechanism comprising valve means for controlling a local brake pipe vent port, an actuating abutment therefor, comprising differential heads normally subject on one side to fluid at brake pipe pressure and means operating in an emergency application of the brakes for admitting fluid under pressure to one side and releasing fluid under pressure from the opposite side of one head to operate said abutment and valve means.

4. In a triple valve device, an emergency valve mechanism comprising valve means for controlling a local brake pipe vent port, an actuating abutment therefor, comprising differential heads normally subject on one side to fluid at brake pipe pressure and means operating in an emergency application of the brakes for admitting fluid from the auxiliary reservoir to one side and venting fluid from the opposite side of one head to thereby operate said abutment and valve means.

5. In a triple valve mechanism, an emergency valve mechanism comprising valve means for controlling a local brake pipe vent port, an actuating abutment therefor having differential heads both normally subject on one side to fluid at brake pipe pressure and means operating upon a sudden reduction in brake pipe pressure for admitting fluid from the auxiliary reservoir to one side and releasing fluid from the opposite side of one head to thereby actuate said abutment and valve means.

6. In a triple valve device, an emergency valve mechanism comprising a main valve for controlling a local brake pipe vent port, an actuating abutment therefor normally subject on one side to fluid under pressure, means operating in an emergency application of the brakes for releasing air from one side of said abutment to actuate the same, and an auxiliary valve having a movement relative to said main valve and adapted upon the preliminary movement of said abutment to open an additional vent port for releasing air from said abutment.

7. In a triple valve device, an emergency valve mechanism comprising a main valve for controlling a local brake pipe vent port, an actuating abutment therefor having differential heads one constantly and the other normally subject to brake pipe pressure in one direction, means operating upon a sudden reduction in brake pipe pressure for venting fluid from the side of the head normally subject to brake pipe pressure to the brake cylinder and for admitting fluid at auxiliary reservoir pressure to the opposite side of said head to operate said abutment and an auxiliary valve having a movement relative to the main valve and adapted upon the preliminary movement of said piston to close the brake cylinder vent port and open a vent port from said head to the atmosphere.

8. In a fluid pressure brake, the combination with a triple valve, auxiliary reservoir, and an additional source of fluid pressure, of an emergency valve mechanism comprising valve means for controlling a local brake pipe vent port and the supply of air from said additional source of fluid pressure to the brake cylinder and an actuating abutment for said valve means comprising differential heads.

9. In a fluid pressure brake, the combination with a triple valve, auxiliary reservoir, supplemental reservoir, and safety valve for limiting the brake cylinder pressure in service applications, of an emergency valve mechanism comprising valve means adapted to control a brake pipe vent port, the supply of air from said supplemental reservoir to the brake cylinder, and communication from the brake cylinder through said safety valve and an abutment comprising differential heads adapted to actuate said valve means according to variations in fluid pressure on one of said heads.

10. In a triple valve device, an emergency valve mechanism comprising a movable abutment having differential heads, one of which is subject to the pressure of a chamber communicating with the brake pipe vent passage, valve means for controlling the release of air from said chamber and means adapted upon a reduction in brake pipe pressure to vent air from one side of the other head to actuate the abutment and valve means and thereby vent the brake pipe.

11. In a triple valve device, an emergency valve mechanism comprising an abutment and valve means actuated by said abutment for opening a brake pipe vent port and supplying air from the auxiliary reservoir to the brake cylinder and means adapted upon equalization of auxiliary reservoir and brake cylinder pressures for operating said valve means to open a communication from an additional source of fluid pressure to the brake cylinder.

12. In a fluid pressure brake, the combination with a train pipe, triple valve, auxiliary reservoir, and brake cylinder, of an additional source of fluid under pressure from which air is supplied to the brake cylinder in emergency applications, a safety valve device for limiting the brake cylinder pressure in service applications, and an abutment and valve means actuated by said abutment for controlling a local train pipe vent port, the supply of air from said additional source of fluid pressure to the brake cylinder, and communication from the brake cylinder through said safety valve device.

In testimony whereof I have hereunto set my hand.

WALTER V. TURNER.

Witnesses:
Wm. M. Cady,
A. M. Clements.